Nov. 16, 1965  G. B. LONG  3,217,884
WASHING DEVICE WITH SELF-CLEANING FILTER
Filed Oct. 26, 1960  2 Sheets-Sheet 1
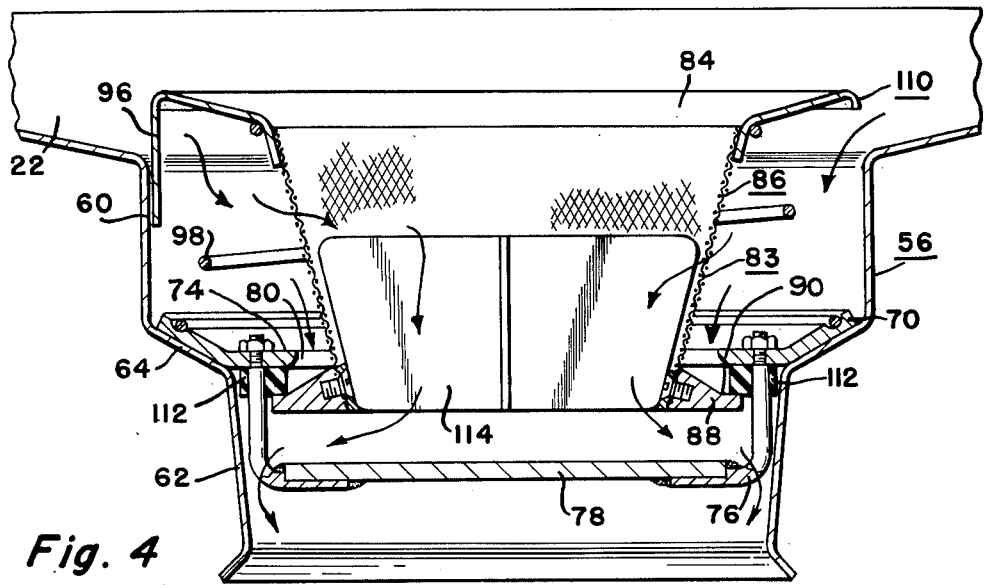
Fig. 4
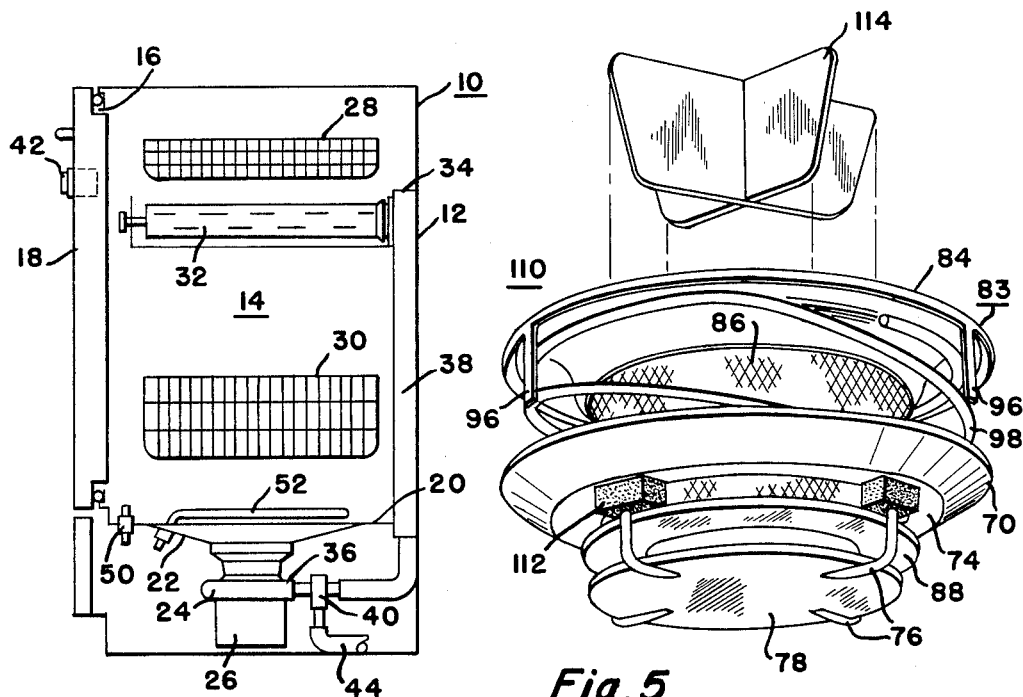
Fig. 1
Fig. 5
INVENTOR.
George B. Long
BY
Frederick M. Ritchie
His Attorney

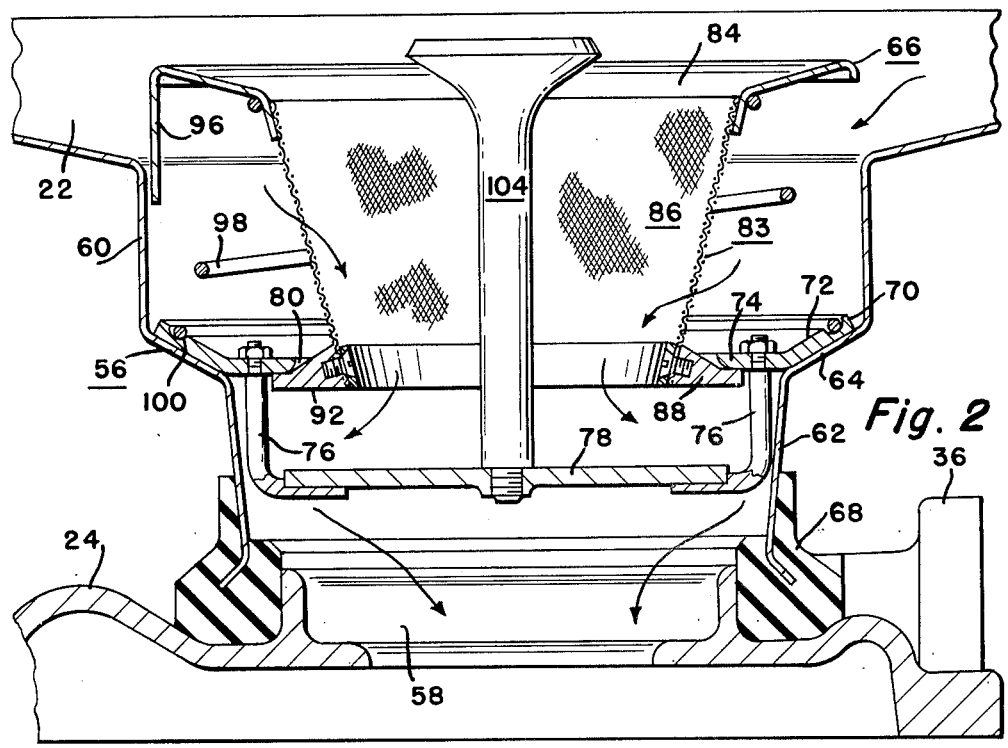
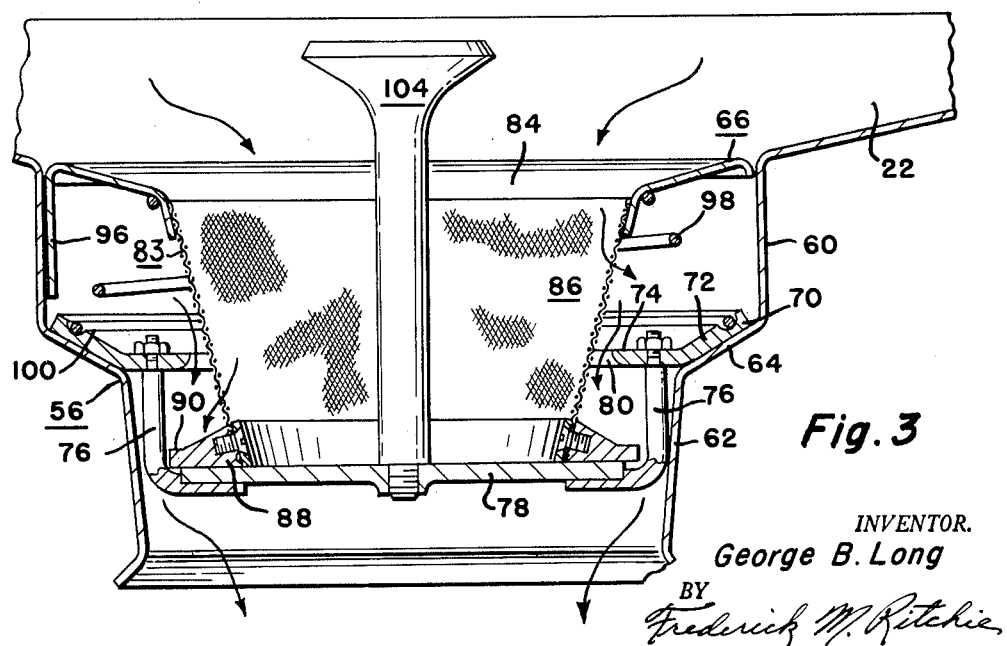

United States Patent Office 3,217,884
Patented Nov. 16, 1965

3,217,884
WASHING DEVICE WITH SELF-CLEANING FILTER
George B. Long, Dayton, Ohio, assignor to General Motors Corporation, Detroit, Mich., a corporation of Delaware
Filed Oct. 26, 1960, Ser. No. 65,071
13 Claims. (Cl. 210—108)

This invention relates to a domestic appliance and more particularly to an improved self-cleaning filter for a dishwasher.

The redeposit of food particles has been a constant problem in dishwashers. Such food particles impair the cleaning results by smudging the surface of the dishes being washed. Various filters have been placed in the circulating water systems of dishwashers with the intent to filter food particles from the water. The prior art arrangements, however, have been such that the food particles become impaled on or entwined with the surface of the filter itself, thereby necessitating frequent cleaning of the filter. Such a cleaning process is necessarily manual and frequent checks as to the condition of the filter are necessary to help the dishwasher operate at top efficiency.

Accordingly, an object of the invention is to provide a filter for a dishwasher which is self-cleaning.

It is another object of this invention to provide a dishwasher with means by which food particles are automatically filtered from a dishwashing liquid and prevented from being redeposited upon the dishes in subsequent dishwashing cycles.

A more specific object of this invention is the provision of a filter for dishwashing liquid, said filter having a screen which is flow responsively located in one position during dishwashing for causing the dishwashing liquid to pass in one direction through said screen to strain said liquid and in a second position during draining to cause said liquid to pass in another direction through said screen to clean said filter.

It is another object of this invention to provide a dishwasher having an automatically operating pop-up strainer which, by the mere action of dishwashing liquid upon it, strains the recirculating liquid and permits the waste discharge of said liquid to clean said strainer.

Further objects and advantages of the present invention will be apparent from the following description, reference being had to the accompanying drawings wherein preferred embodiments of the present invention are clearly shown.

In the drawings:

FIGURE 1 is a schematic side sectional view of a dishwasher suitable for use with this invention;

FIGURE 2 is a fragmentary side sectional view, partly in elevation, of the pop-up filter assembly of this invention in a self-cleaning position;

FIGURE 3 is a view similar to FIGURE 2 of the filter assembly in a recirculating dishwashing liquid straining position;

FIGURE 4 is a fragmentary side sectional view, partly in elevation, of a second embodiment of this invention; and FIGURE 5 is an exploded perspective view of the filter assembly of this invention.

In accordance with this invention and with reference to FIGURE 1 of the drawings a cleaning appliance such as a dishwasher 10 is illustrated. The dishwasher 10 is comprised of a casing 12 defining a dishwashing chamber 14. On the front of the casing an opening 16 is formed and adapted to be closed by a hingedly mounted door 18. The bottom of the dishwashing chamber 14 is defined by a bottom wall 20 in the central portion of which is a depressed sump portion 22 for collecting water over a pump 24 driven by a prime mover or motor 26. Any suitable support means such as reticulated baskets 28, 30 may be slidably positioned within the dishwashing chamber 14 to retain utensils and dishware in a position to receive the jets of cleansing liquid from a water distribution system.

The water distribution system is comprised of a rotatably mounted spray device or spray tube 32 which is rotatably supported on a swirl inducing head 34 at the rear of the dishwashing machine. The pump 24 is provided with an outlet 36 which connects to a conduit 38 by way of a solenoid operated two-way valve 40. The valve 40 is sequentially operated by a dishwasher timer such as 42 to selectively direct water either to the spray tube conduit 38 or to drain line 44. It should be noted that resistance to flow through the spray tube conduit or recirculating conduit 38 is much less than through the waste line 44, i.e., conduit 38 is larger in diameter than drain line 44. Thus the pump 24 when operated during the normal dishwashing portion of the cycle will recirculate approximately 35 gallons per minute to the spray tube 32. On the other hand, when the two-way valve 40 is energized to direct the pump output to the waste line 44, the pump capacity will be cut considerably to approximately 9 gallons per minute. This differential in pump output flow is important to the operation of this invention as will be understood more fully hereinafter.

Water may be admitted to the dishwashing chamber by means of any conventional timer controlled water supply valve 50 and a heater such as 52 may be positioned within the dishwashing chamber for drying the dishes. Further the heater 52 may be positioned within the depressed sump portion 22 of the chamber to intermittently heat the water supplied throughout the washing cycle.

Utilizing the foregoing dishwasher construction, a dishwashing cycle may be initiated by supplying a predetermined amount of water to the sump 22 at the start of the dishwashing cycle. The motor 26 will be energized and the valve 40 arranged so that the pump 24 is made effective to recirculate the water from the sump 22 through the recirculating conduit 38 to the spray tube 32. A swirl, imparted at 34 to the recirculating wash water, will cause the spray tube to rotate, thereby throwing the liquid cleansing agent over the surfaces of the dishes supported in the baskets 28 and 30. This water will then fall by gravity to the sump, returning with it any sediment picked up from the surfaces of the dishware. Without a filtering or straining means this sediment will be carried by the water and recirculated repeatedly over the surfaces of the dishes. This is undesirable since the sediment tends to clog up the flow slots in the spray tube 32 as well as to deposit it on the dishes during the final rinse portions of the cycle. Whatever sediment remains after the final rinse will be baked on to the dishes during the drying cycle. It is therefore an object of this invention to provide means for straining or filtering any sediment or unwanted residue from the recirculating cleansing fluid so that this liquid may be ejected in a clean condition over the surface of the dishes each time the cleansing liquid is recirculated.

A prior art attempt has been made to strain foreign matter from the recirculating cleansing liquid as taught in the patent to Abresch et al. 2,808,063 issued October 1, 1957 and to which reference may be had for additional details of the dishwasher shown in FIGURE 1. However, the present invention is an improvement thereon, since the Abresch et al. strainer required frequent manual cleaning thereof in order to keep the dishwasher in top operating condition. Note in the Abresch filter that the cleansing liquid always passes through the filter on one direction —from the outside to the inisde—on its way to the pump inlet. Stringy type sediment becomes entwined in the perforations of the Abresch filter canister; and the unidirectional flow in conjunction with the trapped sediment prevents the filter from being self cleaning. It is thus an object of this invention to provide a filter which is operated in response to the suction of a dishwasher pump as in the Abresch et al. device but which is self-cleaning due to a novel construction as taught next following.

With reference to FIGURE 2 the improved filtering assembly of this invention will now be fully described. FIGURE 2 is a fragmentary section taken substantially through the center of the sump and attached pump seen in FIGURE 1. Note that the sump wall terminates in an outflow passageway or duct 56 interposed between the dishwashing chamber 14 and an inlet opening or collar 58 to the pump 24. The duct or out flow passage 56 is comprised of an integral sheet metal collar connected to and formed with the sump wall 22. In particular the duct 56 is comprised of a cylindrical upper portion 60, a generally cylindrical lower portion 62 and a slightly conical or sloping annular shoulder 64 interposed between the upper and lower portions to form a support shoulder for receiving the strainer shown generally at 66. As an aid in deadening sound and improving water sealing characteristics between the sump and the pump the lower duct portion 62 may be flared outwardly and supported in an annular rubber seal 68 which closely hugs the outside of the pump inlet collar 58. Thus it may be seen that all water or cleaning fluid flowing from the dishwashing chamber 14 to the pump 24 must pass through the out flow duct 56 before entering the pump inlet 58. The disposition of the strainer or filter 66 within this passage will cause all fluid leaving the dishwashing chamber to be intercepted and strained in one direction through the filter screen, when the pump is in operation to recirculate water to the spray device 32 (FIGURE 1). However, when the pump 24 is operating at reduced capacity while directing water to the waste line 44, the strainer 66 will position itself automatically to pass the liquid to drain in another direction through the filtering screen (FIGURE 3) in order to clean the screen as will be described more fully next following.

The filter or strainer 66 is comprised of a filter screen support ring 70 having a slightly conical annular portion 72 which rests in coplanar support relationship on the annular duct shoulder 64. The ring 70 includes a generally horizontal valve seat portion 74 from which depends a plurality of support pins 76 for attaching a generally circular filter screen bottoming plate 78 immediately below and in spaced parallel planar relationship to an opening 80 in the support ring portion 74. Thus it may be seen that the filter screen support ring 70 and the filter screen bottoming plate 78 are formed into a rigid assembly which is seated within the out flow duct 56.

The strainer 66 is also comprised of a movable filter screen assembly 83 having an upper annular guide portion of baffle 84 connected to a generally frusto-conical screen section 86 of approximately 1/16 inch hole, .015 inch in diameter steel screen, the bottom or lower end of which is attached to a filter screen retaining ring 88. The retaining ring 88 has an upper valve surface 90 which is coplanar with the underside of the support ring portion 74 when the movable screen is in its upper position (FIGURE 2) to seal the opening 80. It also has an opposite smooth bottom surface 92 which mates in coplanar sealing relationship with the bottoming plate 78 when the screen in its lower position as seen in FIGURE 3. The guide collar or baffle 84 is flared outwardly and includes a plurality of depending tabs 96 which lie in closely adjacent relationship to the cylindrical portion 60 of the duct 56. These tab portions 96 will retain the filter screen assembly 83 in a generally upright position as it moves between its upper and lower positions. Interposed between the guide collar 84 and the support ring 70 is a filter screen spring 98, the lower portion of which is positioned in an annular groove 100 on the top of the filter support ring portion 72. The spring 98 serves to bias the screen assembly 83 into its upper position with the retaining ring upper edge 90 in sealing relationship to the underside of the support ring portion 74 to block the outflow of water through the opening 80 around the outside of the screen 86. For convenience in handling the strainer or filter 66 a handle 104 may be attached to the bottoming plate 78 to extend above the movable filter screen assembly 83 for removing the entire filter 66 from the filter duct 56.

In operation water is supplied to the dishwashing chamber 14 in sufficient quantity to fill the sump and the out flow duct 56. With the two-way valve 40 set to cause circulation to the spray device 32 the pump 24 will withdraw water through the out flow duct 56 at a rate of approximately 35 gallons per minute. This rate of flow will suck the filter screen assembly 83 downwardly against the bias of spring 98 until the bottom edge 92 of the retaining ring 88 engages the bottoming plate 78. This position is seen in FIGURE 3. Since the outer periphery of the collar 84 is positioned very close to the side of duct portion 60, substantially all water entering the inlet collar 58 of the pump will be forced into the center of the screen 86 on its way to the pump. Note however (FIGURE 3), that a flow axially through the frusto-conical screen 86 is blocked by the engagement of the ring 88 with the bottoming plate 78. Thus liquid flow will be from the radially inner side of the screen 86 to the radially outer side thereof, through the opening 80 in the support member 70 and around the bottoming plate 78 to the pump inlet collar 58, as shown by the arrows in FIGURE 3. All waste and residue will be trapped on the radially inner side of the screen 86 and the cleansing liquid pumped to the spray device 32 will remain in an uncluttered condition.

After the recirculation or wash cycle is completed the two-way valve 40 will be energized to direct the pump output through the smaller waste line 44. Thus pump output will be cut from approximately 35 gallons per minute to approximately 9 gallons per minute—a flow which is incapable of sucking the filter screen assembly 83 into engagement with the bottoming plate 78. With this reduced flow the spring 98 will force the filter screen assembly 83 into its upper position (FIGURE 2). In this position the filter screen retaining ring 88 will seal against the underside of the support ring portion 74 and water, being withdrawn to the drain, line 44, will flow around the outside of the guide collar 84 and through the screen 86 from its radially outer side to its radially inner side, following then a path through the axial center of the conical screen 86 and around the bottoming plate 78 as shown by the arrows in FIGURE 2. Thus the cleansing liquid, being withdrawn to drain, will reverse its normal flow through the filter screen, thereby cleaning the screen of the residue entrapped thereon during the recirculation portion of the wash cycle.

Occasionally food particles remain suspended in the sump water at the start of the drain cycle. In the embodiment of FIGURES 2 and 3, these particles may be trapped on the outside of the screen and subsequently carried to the spray tube at the start of the next recirculation cycle. Similarly, any sediment which lays on the sump wall 22 at the start of a wash cycle may be flushed to the outside of the screen before the pump has sucked the filler to its seated position. This sediment will then be carried to the spray tube, during recirculation.

To overcome these and other problems a second embodiment of this invention is designed as shown in FIGURES 4 and 5. The second embodiment filter or strainer 110 is constructed generally like the aforementioned filter 66, the only difference being that a plurality of resilient blocks 112 are carried by the support pins 76 to space the upper edge 90 of the filter retaining ring 88 from the underside of the support ring portion 74. This permits a limited amount of water to backwash the outer side of the screen 86 during the drain operation of the pump.

In addition to the spacing blocks 112 the second embodiment is also provided with a streamlining baffle 114 which nests within the inside of the screen 86. It has been found that cavitation results from withdrawal of liquid from the sump faster than it can be supplied to the pump inlet and this causes the filter assembly 83 to lose its suction and lift in response to the bias of spring 98. Whenever the filter lifts during recirculation, the residue already collected moves into the recirculation liquid system and causes redistribution of the residue over the surfaces of the dishes being washed. The application of the baffle 114 produces smooth liquid flow lines without swirl and prevents cavitation within the strainer screen without blocking its ability to filter.

The operation of the second embodiment 110 is substantially like that described in connection with the first embodiment in FIGURES 2 and 3. The flow during recirculation is precisely as shown for the first embodiment in FIGURE 3. However during drain when the pump 24 is operating at reduced capacity flow a portion of the draining liquid will flow along the outside of the screen 86 through the opening 80 in the support ring 70 and between the spacer blocks 112 to the pump inlet 58 as shown by the arrows in FIGURE 4. A major portion of the liquid will still flow from the outside to the inside of the screen 86 cleaning the residue therefrom.

It should now be seen that an improved filtering arrangement has been provided for a dishwashing apparatus. The filter not only is actuated by the pumping rate of the fluid impelling means but is automatically biased into a self-cleaning position when the pump is operating to direct water to drain. Since the filter assembly is self-cleaning, it may remain in the dishwasher for long periods without requiring removal for hand cleaning.

While the embodiments of the present invention as herein disclosed, constitute preferred forms, it is to be understood that other forms might be adopted.

What is claimed is as follows:

1. In combination with a washing chamber containing a predetermined level of liquid and having an outlet duct and a pump, said outlet duct being connected at one end thereof to said chamber and at the other end thereof to said pump for returning liquid to said chamber when said pump is operated in a high capacity flow manner and for directing water to drain when operated in a low capacity flow manner, means conditionable for effecting the operation of said pump in said high capacity flow manner or said low capacity flow manner, a filter assembly in said outlet duct between said chamber and said pump, said filter assembly including a stationary filter support ring in blocking relationship to said outlet duct and having a drain opening, an imperforate filter bottoming plate in spaced parallel planar relationship with said drain opening and connected to said support ring by spaced rods to allow flow between said outlet duct and said bottoming plate, a filter including a generally frusto-conical screen portion having at the bottom thereof a radially extending annular screen retaining ring movable between said bottoming plate and said support ring and substantially coextensive with said bottoming plate, and having at the top thereof a generally radially extending annular collar movable with said retaining ring respectively between a straining position and a cleaning position, said screen portion having an inner side and an outer side and extending through said drain opening below said liquid level, said collar in said straining position extending into closely adjacent liquid flow diverting relationship to said one end of said outlet duct when said retaining ring is moved to said bottoming plate thereby to divert liquid flow to the inner side of said screen portion, said collar in said cleaning position moving out of closely adjacent liquid flow diverting relationship to said one end of said outlet duct when said retaining ring is moved to said support ring thereby to facilitate the flow of at least a portion of said liquid to the outer side of said screen portion, said retaining ring having an upper and lower valve surface, said lower valve surface cooperating with said bottoming plate when said pump is operating in said high capacity flow manner for pulling said lower valve surface into engagement with said bottoming plate and said collar to said straining position to cause said liquid to flow through said screen portion from said inner side to said outer side to filter said liquid, and means for biasing said upper valve surface into engagement with said support ring and the collar into said cleaning position when said pump is operating in said low capacity flow manner to cause at least a portion of said liquid to flow through said screen from said outer side to said inner side to clean said screen portion.

2. In combination with a washing chamber containing a predetermined level of liquid and having an outlet duct and a pump, said outlet duct being connected at one end thereof to said chamber and at the other end thereof to said pump for returning liquid to said chamber when said pump is operated in a high capacity flow manner and for directing water to drain when operated in a low capacity flow manner, means conditionable for effecting the operation of said pump in said high capacity flow manner or said low capacity flow manner, a filter assembly in communication with said outlet duct between said chamber and said pump, said filter assembly including a filter support means in blocking relationship to said outlet duct and having a drain opening, valve seat means in spaced relationship with said drain opening and said outlet duct to allow flow between said outlet duct and said valve seat means, a filter including a screen portion having at the bottom thereof a screen retaining member movable between said valve seat means and said support means and having at the top thereof a liquid flow guide portion movable with said retaining member respectively between a straining position and a cleaning position, said screen portion having an inner side and an outer side and extending through said drain opening below said liquid level, said guide portion in said straining position extending into closely adjacent liquid flow diverting relationship to said one end of said outlet duct when said retaining member is moved to said valve seat means thereby to divert liquid flow to the inner side of said screen portion, said guide portion in said cleaning position moving out of closely adjacent liquid flow diverting relationship to said one end of said outlet duct when said retaining member is moved to said support means thereby to facilitate the flow of at least a portion of said liquid to the outer side of said screen portion, said retaining member having an upper and lower valve surface, said lower valve surface cooperating with said valve seat means when said pump is operating in said high capacity flow manner for pulling said lower valve surface into engagement with said valve seat means and said guide portion to said straining position to cause said liquid to flow through said screen portion from said inner side to said outer side to filter said liquid, and means for biasing said upper valve surface into liquid flow restrictive relationship with said support means and for biasing said guide portion into said cleaning position when said pump is operating in said low capacity flow manner to cause said at least a portion of said liquid to flow through said screen portion from said outer side to said inner side to clean said screen portion.

3. The combination of claim 2 wherein said filter assembly includes means for preventing cavitation in said duct at said filter assembly.

4. The combination of claim 3 wherein said preventing means is comprised of a pair of crossed baffles supported by said retaining member.

5. The combination of claim 4 wherein said support means includes spaced resilient means for forming with said screen retaining member and said support means a passageway for passing a portion of said liquid along said outer side of said screen portion when said pump is operating in said low capacity flow manner.

6. In combination with a washing chamber containing a predetermined level of liquid and having an outlet duct and a pump, said outlet duct being connected at one end thereof to said chamber and at the other end thereof to said pump for returning liquid to said chamber when said pump is operated in a high capacity flow manner and for directing water to drain when operated in a low capacity flow manner, means conditionable for effecting the operation of said pump in said high capacity flow manner or said low capacity flow manner, a filter assembly in said outlet duct between said chamber and said pump, said filter assembly including a stationary filter support ring supported by said outlet duct in liquid flow intercepting relationship to said outlet duct and having a drain opening, an imperforate filter bottoming plate in spaced parallel planar relationship with said drain opening and connected to said support ring by spaced rods to allow flow between said outlet duct and said bottoming plate, a resilient block on one of said spaced rods adjacent said support ring, a filter including a generally frusto-conical screen portion having at the bottom thereof a radially extending annular screen retaining ring movable between said bottoming plate and said resilient block and substantially coextensive with said bottoming plate and having at the top thereof a generally radially extending annular collar movable with said retaining ring respectively between a straining position and a cleaning position, said screen portion having an inner side and an outer side and extending through said drain opening below said liquid level, said collar in said straining position extending into closely adjacent liquid flow diverting relationship to said one end of said outlet duct when said retaining ring is moved to said bottoming plate thereby to divert liquid flow to the inner side of said screen portion, said collar in said cleaning position moving out of closely adjacent liquid flow diverting relationship to said one end of said outlet duct when said retaining ring is moved to said support ring thereby to facilitate the flow of at least a portion of said liquid to the outer side of said screen portion, said retaining ring having an upper and lower valve surface, said lower valve surface cooperating with said bottoming plate when said pump is operating in said high capacity flow manner for pulling said lower valve surface into engagement with said bottoming plate and said collar to said straining position to cause said liquid to flow through said screen portion from said inner side to said outer side to filter said liquid, and means for biasing said upper valve surface into engagement with said resilient block and the collar into said cleaning position when said pump is operating in said low capacity flow manner to cause said liquid to flow along the outer side of said screen and through said screen from said outer side to said inner side to clean said screen portion.

7. The combination of claim 6 including baffle means supported in said frusto-conical screen portion for streamlining liquid flow through said filter assembly.

8. In combination with a washing machine including walls enclosing a washing chamber containing a predetermined level of washing fluid, means for selectively effecting a normal flow of fluid from said chamber, one of said walls being provided with an annular recessed shoulder having a radially outer cylindrical wall defining a washing fluid outlet, a normal fluid flow responsive filter arrangement for selectively restricting said outlet comprising, a filter support ring supported by said shoulder and having a drain opening communicating with said outlet, a bottoming plate beneath said drain opening and connected to said support ring, a filter including a generally cylindrical filter screen portion having at the bottom thereof an annular retaining ring interposed between said bottoming plate and said drain opening and movable between an upper position near said support ring for at least partially closing said drain opening to direct fluid flow mainly through said filter screen portion in one direction and a lower position against said bottoming plate for closing said retaining ring to direct fluid through said filter screen portion in another direction, said screen portion at the top thereof having a collar movable with said retaining ring respectively between an upper position and a lower position, said collar in said lower position extending into closely adjacent fluid flow diverting relationship to said cylindrical wall when said retaining ring is moved to said bottoming plate thereby to divert fluid flow to said screen portion in a manner to direct fluid flow therethrough in said another direction, said collar in said upper position moving out of closely adjacent fluid flow diverting relationship to said cylindrical wall when said retaining ring is moved to said upper position thereby to facilitate the flow of at least a portion of said fluid through said filter screen portion in said one direction, and spring means between said support ring and said filter screen for biasing said retaining ring into said upper position in the absence of said normal fluid flow.

9. The combination of claim 8 wherein said filter screen portion includes a baffle for streamlining said fluid flow.

10. The combination of claim 8 including means for spacing said retaining ring from the periphery of said drain opening in said upper position to direct fluid flow both through said filter screen portion in said one direction and along the outside of said filter screen portion.

11. A self cleaning filter adapted for use with a passageway having an inlet and an outlet and means for effecting a liquid flow through said passageway at a first or second rate of flow, said filter comprising stationary means defining an opening and having blocking means spaced from said opening, means forming a generally cylindrical open end filtering means adapted for extending into said passageway through said opening and movable with respect to said opening, said filtering means having a valve means at one of said open ends movable between a filtering position in engagement with said blocking means for closing said one of said open ends and adapted thereby for connecting one side of said filtering means to said inlet and the other side of said filtering means to said outlet and a self cleaning position in flow restrictive relationship with said stationary means for restricting said opening and opening said one of said open ends in a manner adapted thereby substantially to connect the said other side of said filtering means to said inlet and the said one of side of said filtering means to said outlet, said filtering means having a flow guide means at the other of said open ends movable with said valve means respectively between a filtering position and a self-cleaning position, said guide means in said filtering position adapted for cooperating with said inlet in one manner to divert liquid flow through said other of said open ends to the said one side of said filtering means whereby liquid flowing through said opening is caused to pass from the said one side of said filtering means to the other side thereof to filter said liquid, said guide means in said self-cleaning position adapted for cooperating with said inlet in another manner to divert at least a portion of said liquid from said other of said open ends to the other side of said filtering means whereby liquid flowing through said opening is caused to pass from the said other side of said filtering means to the said one side of said filtering means to clean said filtering means, and means adapted for moving said valve means to said self-cleaning position during one of said first or second rates of flow.

12. The filter of claim 11 including spacer means for cooperating with said valve means in said self-cleaning position and adapted thereby to connect simultaneously said other side of said filtering means to said inlet and said outlet.

13. A self-cleaning filter adapted for use with a chamber and a passageway from said chamber having an inlet means and means for effecting a liquid flow through said passageway at a first or second rate of flow, said filter comprising stationary means defining an opening and having blocking means spaced from said opening, means forming a generally cylindrical open ended screen portion adapted for extending into said passageway through said opening and movable with respect to said opening, said screen portion having a valve means at one of the open ends of said screen portion movable between a first position in engagement with said blocking means for closing said one of the open ends and adapted thereby for placing the inside of said screen portion toward said chamber and a second position in engagement with said stationary means for at least partially closing said opening and adapted thereby to place the outside of said screen portion toward said chamber and for opening said one of the open ends, said screen portion having a liquid flow guide means at the other of said open ends movable with said valve means respectively between a straining position and a cleaning position, said guide means in said straining position adapted for cooperating with said inlet means in one manner to divert liquid flow through said other of said open ends to the inside of said screen portion whereby liquid flowing through said opening is caused to pass from the inside of said screen portion to the outside thereof to strain said liquid, said guide means in said cleaning position adapted for cooperating with said inlet means in another manner to divert at least a portion of said liquid from said other of said open ends to the outside of said screen portion whereby liquid flowing through said opening is caused to pass from the outside of said screen portion to the inside thereof to clean said screen portion, and means adapted for moving said valve means to said second position during one of said first or second rates of flow.

References Cited by the Examiner
UNITED STATES PATENTS

| | | | |
|---|---|---|---|
| 2,083,183 | 6/1937 | Adams | 210—333 |
| 2,734,520 | 2/1956 | Abresch et al. | 134—111 X |

REUBEN FRIEDMAN, *Primary Examiner.*

FRANK W. LUTTER, CHARLES SUKALO, *Examiners.*